(12) United States Patent
Lee et al.

(10) Patent No.: US 6,992,164 B2
(45) Date of Patent: Jan. 31, 2006

(54) ONE-PART POLYURETHANE RESIN COMPOSITION, METHOD OF PREPARING THE SAME, AND METHOD OF PREPARING A PAINT COMPOSITION HAVING THE SAME

(75) Inventors: Ju-Kil Lee, Sungnam (KR); Hee-Jong Kim, Ansan (KR)

(73) Assignee: DPI Co., Ltd., (KR)

( * ) Notice: Subject to any disclaimer, the term of this patent is extended or adjusted under 35 U.S.C. 154(b) by 115 days.

(21) Appl. No.: 10/608,973

(22) Filed: Jun. 27, 2003

(65) Prior Publication Data

US 2004/0236058 A1 Nov. 25, 2004

(30) Foreign Application Priority Data

May 20, 2003 (KR) .................... 10-2003-0031895

(51) Int. Cl.
*C08G 18/10* (2006.01)

(52) U.S. Cl. .................. 528/73; 528/59; 252/182.22; 525/457

(58) Field of Classification Search ............... 528/73, 528/59; 252/182.22; 525/457
See application file for complete search history.

(56) References Cited

U.S. PATENT DOCUMENTS 6,191,212 B1 * 2/2001 Kube .................... 524/590

* cited by examiner

*Primary Examiner*—Rachel Gorr
(74) *Attorney, Agent, or Firm*—Cantor Colburn LLP

(57) ABSTRACT

In a uniformly copolymerized one-part polyurethane resin composition with improved processing behaviors and chemical resistance, the one-part polyurethane resin composition comprises about 20 to 50% by weight of a hard segment and about 50 to 80% by weight of a soft segment. The hard segment reduces drying time and recoating time of a film coated by the composition, and the soft segment improves processing behaviors of the film including rolling and spraying properties. The one-part polyurethane resin composition may further comprise a catalyst. The catalyst may regulate film drying time and improve gloss of a coated film. Thus, the resin composition may be applied in various fields.

10 Claims, No Drawings

ONE-PART POLYURETHANE RESIN COMPOSITION, METHOD OF PREPARING THE SAME, AND METHOD OF PREPARING A PAINT COMPOSITION HAVING THE SAME

CROSS REFERENCE TO RELATED APPLICATION

This application claims priority under 35 USC §119 to Korean Patent Application No. 2003-31895, filed on May 20, 2003, the contents of which are incorporated herein by reference in their entirety.

BACKGROUND OF THE INVENTION

1. Field of the Invention

The present invention relates to a one-part polyurethane resin composition with improved mechanical and chemical properties, a method of preparing the same, and a method of preparing a paint composition having the same. More particularly, the present invention relates to a one-part polyurethane resin composition, which reduces drying time and recoating time and improves chemical resistance of a coated film, a method of preparing the same, and a method of preparing a paint composition having the same.

2. Description of the Related Art

Resins for coating woods are of various kinds. A typical example of one-part paint is lacquer paint for wood filling containing nitrocellulose. The lacquer paint dries fast, but a coated film using the lacquer paint has poor chemical resistance and hardness. Another example of the one-part paint is ultra-violet curable paint. The ultra-violet curable paint, however, requires an expensive ultra-violet curing apparatus.

Two-part paints having polyols and a urethane curing agent, or two-part paints that are acid curable are variously used to coat wood products. Pot life needs to be considered in the two-part paints, because a main agent and a curing agent are mixed. Moreover, recoating a film takes a long time, and a curing process requires particular conditions such as room temperature drying or heating drying depending on characteristics of polyols and a urethane-curing agent. Thus, the two-part paints require a lot of processing time and additional expenses.

Therefore, a one-part polyurethane resin composition, which has a short film drying time, a short recoating time and an improved mechanical properties such as film hardness and chemical resistance and has alleviated processing conditions, is required for wood filling, under coating or top coating.

In addition, methods of preparing the one-part polyurethane resin composition and a paint composition having the same are required, in which a copolymerization reaction of a hard segment and a soft segment is uniformly conducted and a coated film has no partial gloss deterioration caused by a curing rate difference and no wrinkling when recoated.

SUMMARY OF THE INVENTION

Therefore, it is a first feature of the present invention to provide a one-part polyurethane resin composition, which has a short film drying time, simple processing conditions regardless of pot life, and improved film hardness and chemical resistance.

It is a second feature of the present invention to provide a one-part polyurethane resin composition, in which a copolymerization reaction is uniformly conducted to have improved processing behaviors and chemical resistance.

It is a third feature of the present invention to provide a method of preparing the polyurethane resin composition.

It is a fourth feature of the present invention to provide a method of preparing a paint composition including the one-part polyurethane resin composition.

In one aspect of the present invention, the one-part polyurethane resin composition according to the present invention includes about 20 to 50% by weight of a hard segment and about 50 to 80% by weight of a soft segment. The hard segment reduces drying time and recoating time of a film coated by the composition, and the soft segment improves processing behaviors of the film including rolling and spraying properties.

In another aspect of the present invention, the one-part polyurethane resin composition according to the present invention includes a polyurethane resin mixture comprising about 20 to 50% by weight of a hard segment and about 50 to 80% by weight of a soft segment, and a catalyst that is used in a copolymerization reaction of the hard segment and the soft segment. The hard segment reduces drying time and recoating time of a film coated by the composition, and the soft segment improves processing behaviors of the film including rolling and spraying properties.

In a still another aspect of the present invention, a hard segment and a soft segment are prepared. A mixture including about 20 to 50% by weight of the hard segment, about 50 to 80% by weight of the soft segment, and about 0.01 to 1.0% by weight of a catalyst based on a total weight of the hard segment and the soft segment is copolymerized to give a one-part polyurethane resin composition.

In a still another aspect of the present invention, a hard segment and a soft segment are prepared. About 20 to 50% by weight of the hard segment and about 50 to 80% by weight of the soft segment are copolymerized to give a one-part polyurethane resin composition. The one-part polyurethane resin composition is dissolved in a solvent. A catalyst is then added to the dissolved one-part polyurethane resin composition to give the paint composition.

The paint composition including the one-part polyurethane resin composition, according to the present invention, may be used for wood filling, under coating or top coating. A coated film using the paint composition has improved mechanical properties such as chemical resistance and hardness after curing. The catalyst may be added to control drying time and to improve gloss of the coated film. The one-part polyurethane resin composition and the paint composition including the one-part polyurethane resin composition may be applied in various fields depending on coating conditions.

DETAILED DESCRIPTION OF THE INVENTION

Hereinafter, the present invention will be described in detail. It should be apparent that the invention may be modified in arrangement and detail without departing from following principles.

Hereinafter, a one-part polyurethane resin composition according to the present invention is described in detail.

A one-part (i.e., single liquid type) polyurethane resin composition according to the present invention includes about 20 to 50% by weight of a hard segment and about 50 to 80% by weight of a soft segment. The one-part polyurethane resin composition improves mechanical properties of a coated film using the resin composition such as chemical resistance and hardness. A paint composition including the one-part polyurethane resin composition according to the present invention may overcome the above-mentioned problems of conventional one-part paints or two-part paints. The paint composition may be used for wood filling, under coating or top coating.

Examples of the hard segment that may be used in the present invention include an adduct of triol or a trimer of toluene diisocyanate, a trimer of 1,6-hexamethylene diisocyanate or a resin obtained by a Biuret reaction, an adduct of triol or a trimer of isophoron diisocyanate, an adduct resin of triol or a trimer of diphenylmethane diisocyanate, etc. These may be used alone or in a mixture thereof.

The soft segment may be obtained by a reaction of an alcohol and an isocyanate. Examples of the alcohol that may be used in the present invention include polyether polyol, polyester polyol, neopentyl glycol, methylpropanediol, 1,6-hexanediol, ethylene glycol, propylene glycol, 1,4-butylene glycol, 1,3-butylene glycol, trimethylol propane, trimethylol ethane, castor oil, etc. These may be used alone or in a mixture thereof. Examples of the isocyanate that may be used in the present invention include toluene diisocyanate, 1,6-hexamethylene diisocyanate, isophoron diisocyanate, diphenylmethane diisocyanate, etc. These may be used alone or in a mixture thereof.

The alcohol that may be used in preparing the soft segment includes a polyol and a glycol. Examples of the polyol that may be used in the present invention include polyether polyol, polyester polyol and mixtures thereof. Examples of the glycol that may be used in the present invention include neopentyl glycol, methylpropanediol, 1,6-hexanediol, ethylene glycol, propylene glycol, 1,4-butylene glycol, 1,3-butylene glycol, trimethylol propane, trimethylol ethane, castor oil, etc. These may be used alone or in a mixture thereof.

In order to obtain the one-part polyurethane resin composition according to the present invention, about 20 to 50% by weight of the hard segment and about 50 to 80% by weight of the soft segment are mixed.

When the hard segment content is less than about 20% by weight, drying time and recoating time increase and a film hardness using the resin composition decreases after a complete curing. When the hard segment content is more than about 50% by weight, a coated film is hard but easily cracked. Therefore, the one-part polyurethane resin composition includes about 20 to 50%, preferably about 25 to 45%, by weight of the hard segment.

When the soft segment content is more than about 80% by weight, drying time and recoating time increase and hardness of a film using the resin composition decreases after a complete curing. When the soft segment content is less than about 50% by weight, a coated film is hard but easily cracked. Therefore, the one-part polyurethane resin composition includes about 50 to 80%, preferably about 55 to 75% by weight of the soft segment.

Among polyols and glycols used in preparing the soft segment, polyether polyol and polyester polyol are linear types, and a content of polyol having a weight average molecular weight of about 500 to 3000 is about 30 to 70% by moles with respect to total moles of the polyol and the glycol.

When a weight average molecular weight of the polyol is less than about 500, a film-formable soft segment is not obtained. When a weight average molecular weight of the polyol is more than about 3000, a viscosity of a resulting resin increases to deteriorate processing behaviors such as rolling and spraying properties, and a soft segment is excessively formed to impair hardness and chemical resistance of a coated film.

When the polyol content is less than about 30% by moles with respect to total moles of the polyol and the glycol, i.e., the contents of a low molecular weight glycol are more than about 70% by moles, a coated film is not soft. When the polyol content is more than about 70% by moles with respect to total moles of the polyol and the glycol, i.e., the content of low molecular weight glycol is less than about 30% by moles, the coated film is too soft and a drying property, hardness and chemical resistance of the coated film are impaired.

According to the present invention, the hard segment and the soft segment are copolymerized to have about 4 to 15% of isocyanate content (hereinafter, referred to as NCO %). When the NCO % is less than about 4, curing density, hardness and chemical resistance of a coated film decrease. When the NCO % is more than about 15%, a coated film is hard but easily cracked and a storage property of the product is impaired.

According to the present invention, the one-part polyurethane resin composition has an improved mechanical property such as chemical resistance and hardness compared to prior one-part resin compositions. The resin composition according to the present invention may be applied in various fields depending on coating conditions.

In a preferred example of the present invention, a one-part polyurethane resin composition according to the present invention includes a polyurethane resin mixture including about 20 to 50% by weight of a hard segment and about 50 to 80% by weight of a soft segment, and a catalyst.

Examples of the hard segment that may be used in the present invention include an adduct of triol or a trimer of toluene diisocyanate, a trimer of 1,6-hexamethylene diisocyanate or a resin obtained by a Biuret reaction, an adduct of triol or a trimer of isophoron diisocyanate, an adduct resin of triol or a trimer of diphenylmethane diisocyanate, etc. These may be used alone or in a mixture thereof.

The soft segment may be obtained by a reaction of an alcohol and an isocyanate. Examples of the alcohol that may be used in the present invention include polyether polyol, polyester polyol, neopentyl glycol, methylpropanediol, 1,6-hexanediol, ethylene glycol, propylene glycol, 1,4-butylene glycol, 1,3-butylene glycol, trimethylol propane, trimethylol ethane, castor oil, etc. These may be used alone or in a mixture thereof. Examples of the isocyanate that may be used in the present invention include toluene diisocyanate, 1,6-hexamethylene diisocyanate, isophoron diisocyanate, diphenylmethane diisocyanate, etc. These may be used alone or in a mixture thereof.

The alcohol that may be used in preparing the soft segment includes a polyol and a glycol. Examples of the polyol that may be used in the present invention include polyether polyol, polyester polyol and mixtures thereof. Examples of the glycol that may be used in the present invention include neopentyl glycol, methylpropanediol, 1,6-hexanediol, ethylene glycol, propylene glycol, 1,4-butylene glycol, 1,3-butylene glycol, trimethylol propane, trimethylol ethane, castor oil, etc. These may be used alone or in a mixture thereof.

In order to obtain the one-part polyurethane resin composition according to the present invention, about 20 to 50% by weight of the hard segment and about 50 to 80% by weight of the soft segment are mixed.

When the hard segment content is less than about 20% by weight, film drying time and recoating time increase and the hardness of a film using the resin composition decreases after a complete curing. When the hard segment content is more than about 50% by weight, the coated film is hard but easily cracked. Therefore, the one-part polyurethane resin composition includes about 20 to 50%, preferably about 25 to 45%, by weight of the hard segment.

When the soft segment content is more than about 80% by weight, film drying time and recoating time increase and hardness of a film using the resin composition decreases after a complete curing. When the soft segment content is less than about 50% by weight, the coated film is hard but easily cracked. Therefore, the one-part polyurethane resin composition includes about 50 to 80%, preferably about 55 to 75% by weight of the soft segment.

Among polyols and glycols used in preparing the soft segment, polyether polyol and polyester polyol are linear types, and a content of polyol having a weight average molecular weight of about 500 to 3000 is about 30 to 70% by moles with respect to total moles of the polyol and the glycol.

When the weight average molecular weight of the polyol is less than about 500, a film-formable soft segment is not obtained. When the weight average molecular weight of the polyol is more than about 3000, the viscosity of the resulting resin increases to deteriorate processing behaviors such as rolling and spraying properties, and the soft segment is excessively formed to impair hardness and chemical resistance of a coated film.

When the polyol content is less than about 30% by moles with respect to total moles of the polyol and the glycol, i.e., the low molecular weight glycol content is more than about 70% by moles, a coated film is not soft. When the polyol content is more than about 70% by moles with respect to total moles of the polyol and the glycol, i.e., the low molecular weight glycol content is less than about 30% by moles, a coated film is too soft and a drying property, hardness and chemical resistance of the coated film are impaired.

According to the present invention, the hard segment and the soft segment are copolymerized to have about 4 to 15% of isocyanate content (hereinafter, referred to as NCO %). When the NCO % is less than about 4, curing density, hardness and chemical resistance of a coated film decrease. When the NCO % is more than about 15%, a coated film is hard but easily cracked and the storage property of the product is impaired.

According to the present invention, when the hard segment and the soft segment are copolymerized, the catalyst is used to conduct a uniform reaction in order to maintain NCO %, to reduce un-reacted NCO %, and to form a uniformly cured film after coating. When the reaction between the hard segment and the soft segment is not uniformly conducted, gloss of the coated film is partially impaired during an air curing, i.e. a wet curing, due to a curing rate difference. Moreover, the coated film wrinkles while recoated.

Morpholines, amines and metal salts are used as the catalyst. Examples of the catalyst that may be used in the present invention include methyl morpholine, ethyl , morpholine, triethyl amine, dimethylbenzyl amine, dimethylethanol amine, ethylene diamine, dimethyllauryl amine, dimethyl piperazine, triethylene diamine, tetramethylethylene diamine, tetramethylhexamethylene diamine, 1,3,5-tridiaminomethyl phenol (for example, K54 which is available from Anchor Chemical Company), 1,4-diaza-(2,2,2) bicyclooctane (for example, DABCO which is available from Air Products), hexamethyltriethylene tetramine, lead naphthenate, lead octoate, dibutyl tin dilaurate, tin ethylhexanoate, zirconium octoate, zirconium ,naphthenate. etc. These may be used alone or in a mixture thereof.

Tertiary amines or metal salts or compounds containing lead (Pb) or tin (Sn) are particularly preferred.

When the catalyst content is less than about 0.01% by weight, the effect of the catalyst is insufficient to fail reducing a curing rate difference between the hard segment and the soft segment. Thus, a coated film wrinkles while recoated. When the catalyst content is more than about 1.0% weight, film gloss and the storage property of the product deteriorate. Moreover, the film is easily cracked by external impacts or conditions. Therefore, the amount of the catalyst used in the copolymerization reaction of the hard segment and the soft segment is about 0.01 to 1.0% by weight based on a total weight of the hard segment and the soft segment. The catalyst content is preferably about 0.1 to 0.5% by weight based on a total weight of the hard segment and the soft segment.

According to the present invention, a method of preparing the one-part polyurethane resin composition is provided.

First, the above-described hard segment and the soft segment are prepared. About 20 to 50% by weight of the hard segment, about 50 to 80% by weight of the soft segment, and 0.01 to 1.0% by weight of a catalyst based on a total weight of the hard segment and the soft segment are mixed and copolymerized.

According to the present invention, when the hard segment and the soft segment are copolymerized, the catalyst is used to conduct a uniform reaction in order to maintain NCO %, to reduce un-reacted NCO %, and to form a uniformly cured film after coating. When the reaction between the hard segment and the soft segment is not uniformly conducted, the coated film gloss is partially impaired during an air curing, i.e. a wet curing, due to a curing rate difference. Moreover, the coated film wrinkles while recoated.

Morpholines, amines and metal salts are used as the catalyst. Examples of the catalyst that may be used in the present invention include methyl morpholine, ethyl morpholine, triethyl amine, dimethylbenryl amine, dimethylethanol amine, ethylene diamine, dimethyllauzyl amine, dimethyl piperazine, triethylene diamine, tetramethylethylene diamine, tetramethylhexamethylene diamine, 1,3,5-tridiaminomethyl phenol (for example, K54 which is available from Anchor Chemical Company), 1,4-diaza-(2,2,2)bicyclooctane (for example, DABCO which is available from Air Products), hexamethyltriethylene tetramine, lead naphthenate, lead octoate, dibutyl tin dilaurate, tin ethylhexanoate, zirconium octoate, zirconium ,naphthenate. etc. These may be used alone or in a mixture thereof.

Tertiary amines or metal salts or compounds containing lead (Pb) or tin (Sn) are particularly preferred.

When the catalyst content is less than about 0.01% by weight, an effect of the catalyst is insufficient to prevent a curing rate difference between the hard segment and the soft segment. Thus, a coated film wrinkles while recoated. When the catalyst content is more than about 1.0% weight, film gloss and a storage property of the product deteriorate. Moreover, the film is easily cracked by external impacts or conditions. Therefore, the amount of the catalyst used in the copolymerization reaction of the hard segment and the soft segment is about 0.01 to 1.0% by weight based on a total weight of the hard segment and the soft segment. The catalyst content is preferably about 0.1 to 0.5% by weight based on a total weight of the hard segment and the soft segment.

When the catalyst is added in the copolymerization of the hard segment and the soft segment, drying time is reduced, and hardness and gloss of the resulting film are improved.

The catalyst may be used in preparing the one-part polyurethane resin composition as described above. In addition, depending on a coating temperature or a coating condition, the catalyst may be used as below when a film is coated after the one-part polyurethane resin composition having the hard segment and the soft segment is prepared.

According to the present invention, a method of preparing a paint composition including the one-part polyurethane resin composition is provided. A catalyst is not added in the copolymerization reaction. Instead, the catalyst may be used, depending on a coating temperature or a coating condition, when a film is coated.

First, a hard segment and a soft segment are prepared. About 20 to 50% by weight of the hard segment and about 50 to 80% by weight of the soft segment are copolymerized in the absence of a catalyst to prepare a one-part polyurethane resin composition.

The one-part polyurethane resin composition is dissolved in a solvent. An amount of the solvent used in dissolving the one-part polyurethane resin composition is about 5 to 20% by weight based on a total weight of the one-part polyurethane resin composition. Examples of the solvent that may be used in the present invention include xylenes, toluenes, ketones such as methyl ethyl ketone (MEK), etc. These may be used alone or in a mixture thereof.

Then, 0.01 to 1.0% by weight of the catalyst based on a total weight of the soft segment and the hard segment is added to the dissolved one-part polyurethane resin composition to give the paint composition. The catalyst is added as a raw material or as a solvent-diluted solution for a convenient use.

After the catalyst is added, the paint composition including the catalyst may be stirred to make a uniform mixture.

As described above, the catalyst is not added in the copolymerization reaction of the hard segment and the soft segment. The catalyst is added when the paint composition is prepared using the one-part polyurethane resin composition. Thus, the catalyst may be used depending coating conditions and environments.

Hereinafter, the present invention will be described in detail with reference to following examples.

Example 1

Preparing a Soft Segment

A 2 l, 4-neck flask was set with a thermometer, a condenser, a stirrer and a heating device. 52 g of neopentyl glycol, 45 g of 1,4-butylene glycol and 510 g of polyol were added to the flask and dissolved at 40° C. The polyol, a kind of etherpolyol, has a weight average molecular weight of 1000 and a hydroxyl value of 105 to 110. Then, 392 g of toluene diisocyanate were added to the flask. A reaction continued at 75° C. until un-reacted toluene diisocyanate content was less than about 0.3%. Butyl acetate was then added to the flask to obtain a soft segment having 50% of solid content and 6.4% of NCO %.

Preparing a One-part Polyurethane Resin Composition

A 2 l, 4-neck flask was set with a thermometer, a condenser, a stirrer and a heating device. 700 g of the soft segment obtained in the previous step and 300 g of a toluene diisocyanate trimer diluted with butyl acetate to have 50% of solid content and 16±0.2% of NCO % were mixed at a room temperature in the absence of a catalyst. The soft segment and the hard segment were copolymerized in a ratio of 70:30 to obtain a one-part polyurethane resin composition having 9.1 to 9.4% of NCO %.

Example 2

Preparing a Soft Segment

A 2 l, 4-neck flask was set with a thermometer, a condenser, a stirrer and a heating device. 67.5 g of methylpropanediol, 45 g of 1,4-butylene glycol and 450 g of polyol were added to the flask and dissolved at 40° C. The polyol, a kind of esterpolyol, has a weight average molecular weight of 1800 and a hydroxyl value of 60 to 65. Then, 392 g of toluene diisocyanate were added to the flask. A reaction continued at 75° C. until un-reacted toluene diisocyanate content was less than about 0.3%. Butyl acetate was then added to the flask to obtain a soft segment having 50% of solid content and 6.6% of NCO %.

Preparing a One-part Polyurethane Resin Composition

A 2 l, 4-neck flask was set with a thermometer, a condenser, a stirrer and a heating device. 700 g of the soft segment obtained in the previous step and 300 g of a toluene diisocyanate trimer diluted with butyl acetate to have 50% of solid content and 16±0.2% of NCO % were mixed at a room temperature in the absence of a catalyst. The soft segment and the hard segment were copolymerized in a ratio of 70:30 to obtain a one-part polyurethane resin composition having 9.2 to 9.6% of NCO %.

Example 3

A 2 l, 4-neck flask was set with a thermometer, a condenser, a stirrer and a heating device. 700 g of the soft segment obtained in Example 1, 300 g of a toluene diisocyanate trimer diluted with butyl acetate to have 50% of solid content and 16±0.2% of NCO % and 0.3 g of tin ethyl hexanoate as a catalyst were added to the flask and mixed. The soft segment and the hard segment were copolymerized in a ratio of 70:30 to obtain a one-part polyurethane resin composition having 9.1 to 9.4% of NCO %.

Example 4

Preparing a Soft Segment

A 2 l, 4-neck flask was set with a thermometer, a condenser, a stirrer and a heating device. 42 g of neopentyl glycol, 45 g of 1,4-butylene glycol, 9 g of trimethylol propane and 510 g of polyol were added to the flask and dissolved at 40° C. The polyol, a kind of etherpolyol, has a weight average molecular weight of 1000 and a hydroxyl value of 105 to 110. Then, 392 g of toluene diisocyanate were added to the flask. A reaction took place at 75° C. until un-reacted toluene diisocyanate content was less than about 0.3%. Butyl acetate was then added to the flask to obtain a soft segment having 50% of solid content and 6.3% of NCO %.

Preparing a One-part Polyurethane Resin Composition

A 2 l, 4-neck flask was set with a thermometer, a condenser, a stirrer and a heating device. 600 g of the soft segment obtained in the above step, 300 g of a toluene diisocyanate trimer diluted with butyl acetate to have 50% of solid content and 16±0.2% of NCO %, 10 g of an adduct resin of trimethylol propane and a toluene diisocyanate trimer diluted with butyl acetate to have 50% of solid content and 17±0.5% of NCO %, and 0.3 g of tin ethyl hexanoate as a catalyst were added to the flask and mixed. The soft segment and the hard segment were copolymerized in a ratio of 60:40 to obtain a one-part polyurethane resin composition having 10.1 to 10.4% of NCO %.

Example 5

A 2 l, 4-neck flask was set with a thermometer, a condenser, a stirrer and a heating device. 700 g of the soft segment obtained in Example 2, 300 g of a toluene diisocyanate trimer diluted with butyl acetate to have 50% of solid content and 16±0.2% of NCO % and 0.3 g of tin ethyl hexanoate as a catalyst were added to the flask and mixed. The soft segment and the hard segment were copolymerized in a ratio of 70:30 to obtain a one-part polyurethane resin composition having 9.2 to 9.6% of NCO %.

Example 6

A 2 l, 4-neck flask was set with a thermometer, a condenser, a stirrer and a heating device. 600 g of the soft segment obtained in Example 2, 300 g of a toluene diisocyanate trimer diluted with butyl acetate to have 50% of solid content and 16±0.2% of NCO %, 100 g of a 1,6-hexamethylene diisocyanate trimer diluted with butyl acetate to have 50% of solid content and 20.5 to 22% of NCO %, and 0.3 g of tin ethyl hexanoate as a catalyst were added to the flask and mixed. The soft segment and the hard segment were copolymerized in a ratio of 60:40 to obtain a one-part polyurethane resin composition having 10.8 to 11.2% of NCO %.

Example 7

A 2 l, 4-neck flask was set with a thermometer, a condenser, a stirrer and a heating device. 600 g of the soft segment obtained in Example 4, 300 g of a toluene diisocyanate trimer diluted with butyl acetate to have 50% of solid content and 16±0.2% of NCO %, 10 g of an adduct resin of trimethylol propane and a toluene diisocyanate trimer diluted with butyl acetate to have 50% of solid content and 17±0.5% of NCO %, and 0.2 g of 1,4-diaza-(2, 2,2)bicyclooctane (DABCO which is available from Air Products) as a catalyst were added to the flask and mixed. The soft segment and the hard segment were copolymerized in a ratio of 60:40 to obtain a one-part polyurethane resin composition having 10.1 to 10.4% of NCO %.

Example 8

A 2 l, 4-neck flask was set with a thermometer, a condenser, a stirrer and a heating device. 700 g of the soft segment obtained in Example 2, 300 g of a toluene diisocyanate trimer diluted with butyl acetate to have 50% of solid content and 16±0.2% of NCO % and 0.3 g of dibutyl tin dilaurirate as a catalyst were added to the flask and mixed. The soft segment and the hard segment were copolymerized in a ratio of 70:30 to obtain a one-part polyurethane resin composition having 9.2 to 9.6% of NCO %.

Comparative Example

A nitrocellulose type lacquer was used for wood filling and under coating. A two part resin composition having equivalent ratio of alkyd resin polyol and an adduct of trimethylol propane and toluene diisocyanate was used for top coating. The alkyd resin polyol has 130 to 150 of a hydroxyl value and contains 30% of oil. The adduct of trimethylol propane and toluene diisocyanate was used as a curing agent. A coated film from the two-part resin composition was compared with coated films from resin compositions of the present invention.

The adduct is a mixture of trimethylol propane and monomers of toluene diisocyanate and has three isocyanate functional groups. Trimethylol propane and toluene diisocyanate were reacted in a ratio of 1:3 and non-volatile components were diluted to 75% to obtain an adduct with 13±0.5% of NCO %.

Properties of coated films including the polyurethane resin compositions form Examples and Comparative examples are shown in the following Table 1. In a test, woods from an oak tree were roller coated by the resin compositions and dried at a room temperature. Mechanical properties of coated films were tested.

TABLE 1

Test results of coating of a polyurethane resin for wood

| mechanical property | | Example 1 | Example 2 | Example 3 | Example 4 | Example 5 | Example 6 | Example 7 | Example 8 | Comparative example |
|---|---|---|---|---|---|---|---|---|---|---|
| drying property (min) | wood filling | 8 | 12 | 3 | 5 | 3 | 8 | 5 | 4 | 12 |
| | under coating | 10 | 15 | 3 | 5 | 3 | 8 | 5 | 4 | 12 |
| | top coating | 15 | 25 | 4 | 5 | 3 | 10 | 6 | 7 | 90 |
| gloss(60□) | | 98 | 98 | 100 | 100 | 100 | 100 | 100 | 100 | 95 |
| Cross-cut | | 100/100 | 100/100 | 100/100 | 100/100 | 100/100 | 100/100 | 100/100 | 100/100 | 100/100 |
| acid resistance | 5% Sulfuric acid | ◎ | ◎ | ◎ | ◎ | ◎ | ◎ | ◎ | ◎ | ◎ |
| | 5% Nitric acid | ◎ | ◎ | ◎ | ◎ | ◎ | ◎ | ◎ | ◎ | ○ |
| | 5% Hydrochloric acid | ◎ | ◎ | ◎ | ◎ | ◎ | ◎ | ◎ | ◎ | ◎ |
| alkali resistance | | ◎ | ◎ | ◎ | ◎ | ◎ | ◎ | ◎ | ◎ | ○ |
| storage property | | good | good | good | good | good | good | good | good | not measurable |

TABLE 1-continued

Test results of coating of a polyurethane resin for wood

| mechanical property | Example 1 | Example 2 | Example 3 | Example 4 | Example 5 | Example 6 | Example 7 | Example 8 | Comparative example |
|---|---|---|---|---|---|---|---|---|---|
| pencil hardness | 3H | 2H+ | 3H+ | 2H | 3H | 2H | 2H | 3H | H |

In Table 1, meanings of marks are as below. In acid resistance and alkali resistance test results, ⊚ means excellent, ○ means good, Δ means ordinary, and X means poor.

Mechanical properties in Table 1 were measured as below. Film drying time in wood filling, under coating or top coating is a time required to recoat the coated film. Other mechanical properties were checked after the coated film was dried for 48 hours. Gloss of the coated film was tested using an ASTM-D-523 method, and crosscut of the coated film was tested using an NCCA-II-20 method. Acid resistance was checked by a surface condition including swelling of a coated film after impregnating the film in the acids for 4 hours. Alkali resistance was checked by a surface condition including swelling of a coated film after impregnating the film in a 20% sodium hydroxide solution for 4 hours. Pencil hardness was tested using an NCCA-II-12 method, and a storage property was tested by checking a gelling degree of the compositions after storing them in 1 l closed cans for 30 days at 60° C.

As shown in Table 1, a one-part polyurethane resin composition according to the present invention is used in wood filling, under coating or top coating. A coated film using a one-part polyurethane resin composition according to the present invention has a short drying time and recoating time in wood filling, under coating or top coating. Unlike two-part paints, pot life is not considered. Hardness and chemical resistance of the film are improved after curing. In addition, a catalyst may control film drying time. The one-part polyurethane resin composition may be applied in various fields depending on a coating condition.

As shown in Table 1, when a catalyst is added to a one-part polyurethane resin composition, film drying time is reduced and hardness and gloss of the coated film are improved. According to the present invention, a new one-part polyurethane composition is obtained by adding a catalyst.

What is claimed is:

1. A one-part polyurethane resin composition for paint comprising:
    about 30 to 50% by weight of a hard segment, the hard segment reducing drying time and recoating time of a film coated by the composition; and
    about 50 to 70% by weight of a soft segment, the soft segment improving processing behaviors of the film including rolling and spraying properties.

2. A one-part polyurethane resin composition of claim 1, wherein the hard segment is at least one selected from the group consisting of an adduct of triol or a trimer of toluene diisocyanate, a trimer of 1,6-hexamethylene diisocyanate or a resin obtained by a Biuret reaction, an adduct of triol or a trimer of isophoron diisocyanate, and an adduct resin of triol or a trimer of diphenylmethane diisocyanate.

3. A one-part polyurethane resin composition of claim 1, wherein the soft segment is obtained by a reaction of at least one alcohol selected from the group consisting of polyether polyol, polyester polyol, neopentyl glycol, methylpropanediol, 1,6-hexanediol, ethylene glycol, propylene glycol, 1,4-butylene glycol, 1,3-butylene glycol, trimethylol propane, trimethylol ethane and castor oil, and at least one isocyanate selected from the group consisting of toluene diisocyanate, 1,6-hexamethylene diisocyanate, isophoron diisocyanate and diphenylmethane diisocyanate.

4. A one-part polyurethane resin composition comprising about 20 to 50% by weight of a hard segment, the hard segment reducing drying time and recoating time of a film coated by the composition; and
    about 50 to 80% by weight of a soft segment, the soft segment improving processing behaviors of the film including rolling and spraying properties,
    wherein the soft segment is obtained by a reaction of at least one alcohol wherein the alcohol comprises at least one polyol selected front the group consisting of polyether polyol, polyester polyol and mixtures thereof, and at least one glycol selected front the group consisting of neopentyl glycol, methylpropanediol, 1,6-hexanediol, ethylene glycol, propylene glycol, 1,4-butylene glycol, 1,3-butylene glycol, trimethylol propane, trimethylol ethane and castor oil.

5. A one-part polyurethane resin composition of claim 4, wherein the polyol is a linear type and a content of polyol having a weight average molecular weight of about 500 to 3000 is about 30 to 70% by moles with respect to total moles of the alcohol.

6. A one-part polyurethane resin composition of claim 1, wherein isocyanate content (NCO %) of the one-part polyurethane resin composition is about 4 to 15%.

7. A one-part polyurethane resin composition for paint comprising: a polyurethane resin mixture comprising
    about 30 to 50% by weight of a hard segment, the hard segment reducing drying time and recoating time of a film coated by the resin, and
    about 50 to 70% by weight of a soft segment, the soft segment improving processing behaviors of the film including rolling and spraying properties; and
    a catalyst that is used in a copolymerization reaction of the hard segment and the soft segment.

8. A one-part polyurethane resin composition of claim 7, wherein an amount of the catalyst used in the copolymerization reaction of the hard segment and the soft segment is about 0.01 to 1.0% by weight based on a total weight of the hard segment and the soft segment.

9. A one-part polyurethane resin composition of claim 7, wherein the catalyst is at least one selected from the group consisting of methyl morpholine, ethyl morpholine, triethyl amine, dimethyl benzyl amine, dimethyl ethanol amine, ethylene diamine, dimethyl lauryl amine, dimethyl piperazine, triethylene diamine, tetramethyl ethylene diamine, tetramethyl hexamethylene diamine, 1,3,5-tridiaminomethyl phenol, 1,4-diaza-(2,2,2)bicyclooctane, hexamethyl triethylene tetramine, lead naphthenate, lead octoate, dibutyl tin dilaurate, tin ethyl hexanoate, zirconium octoate and zirconium naphthenate.

10. A method of preparing a one-part polyurethane resin composition for paint comprising:
  preparing a hard segment and a soft segment; and
  copolymerizing a mixture including about 30 to 50% by weight of the hard segment, about 50 to 70% by weight of the soft segment, and 0.01 to 1.0% by weight of a catalyst based on a total weight of the hard segment and the soft segment.

* * * * *